US007054808B2

(12) United States Patent
Yoshida

(10) Patent No.: US 7,054,808 B2
(45) Date of Patent: May 30, 2006

(54) NOISE SUPPRESSING APPARATUS AND NOISE SUPPRESSING METHOD

(75) Inventor: Koji Yoshida, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 801 days.

(21) Appl. No.: 10/111,806

(22) PCT Filed: Aug. 30, 2001

(86) PCT No.: PCT/JP01/07452

§ 371 (c)(1), (2), (4) Date: Apr. 29, 2002

(87) PCT Pub. No.: WO02/19318

PCT Pub. Date: Mar. 7, 2002

(65) Prior Publication Data

US 2002/0156623 A1 Oct. 24, 2002

(30) Foreign Application Priority Data

Aug. 31, 2000 (JP) ............................ 2000-264196

(51) Int. Cl.
*G10L 21/00* (2006.01)
*G10L 21/02* (2006.01)
*G10L 15/00* (2006.01)
*G10L 15/20* (2006.01)

(52) U.S. Cl. ....................... 704/226; 704/227; 704/233

(58) Field of Classification Search ..................... None
See application file for complete search history.

(56) References Cited

U.S. PATENT DOCUMENTS 5,757,937 A * 5/1998 Itoh et al. .................. 381/94.3
5,960,391 A 9/1999 Tateishi et al.
5,974,373 A * 10/1999 Chan et al. ................. 704/200
6,044,341 A * 3/2000 Takahashi ................... 704/226

(Continued)

FOREIGN PATENT DOCUMENTS

JP 03266899 11/1991

(Continued)

OTHER PUBLICATIONS

Berouti, M. Schwartz, R. Makhoul, J. “Enhancement of Speech Corrupted by Acoustic Noise”, Acoustics, Speech and Signal Processing, Apr. 1979, pp. 208-211.*

(Continued)

*Primary Examiner*—David Hudspeth
*Assistant Examiner*—Matthew J. Sked
(74) *Attorney, Agent, or Firm*—Stevens, Davis, Miller & Mosher, LLP

(57) ABSTRACT

Speech/non-speech determining section 103 makes a speech/non-speech determination of whether a speech spectrum is of a speech interval with a speech included or of a non-speech interval with only a noise and no speech included. Noise spectrum estimating section 104 estimates a noise spectrum based on the speech spectrum determined as the non-speech interval. SNR estimating section 105 obtains speech signal power from the speech interval and noise signal power from the non-speech interval in the speech spectrum, and calculates SNR from a ratio of two values. Based on the speech/non-speech determination and a value of SNR, suppression coefficient control section 106 outputs a suppression lower limit coefficient to spectrum subtraction section 107. Spectral subtraction section 107 subtracts an estimated noise spectrum from the input speech spectrum, and outputs a speech spectrum with a noise suppressed.

11 Claims, 8 Drawing Sheets

U.S. PATENT DOCUMENTS

| | | | | |
|---|---|---|---|---|
| 6,070,137 | A * | 5/2000 | Bloebaum et al. .......... | 704/227 |
| 6,292,520 | B1 * | 9/2001 | Tsukahara ................... | 375/346 |
| 6,687,669 | B1 * | 2/2004 | Schrogmeier et al. ...... | 704/226 |
| 2001/0016020 | A1 * | 8/2001 | Gustafsson et al. ......... | 375/346 |

FOREIGN PATENT DOCUMENTS

| | | |
|---|---|---|
| JP | 04184400 | 7/1992 |
| JP | 06274196 | 9/1994 |
| JP | 07160294 | 6/1995 |
| JP | 07248793 | 9/1995 |
| JP | 09160594 | 6/1997 |
| JP | 09212196 | 8/1997 |
| JP | 09311698 | 12/1997 |
| JP | 10049197 | 2/1998 |
| JP | 2000047697 | 2/2000 |
| JP | 2000330597 | 11/2000 |
| JP | 2001320289 | 11/2001 |
| WO | 8700366 | 1/1987 |
| WO | 0048171 | 8/2000 |

OTHER PUBLICATIONS

Matsumoto, H. Naitoh, N. "Smoothed Spectral Subtraction for a Frequency-Weighted Speech Recognition", Spoken Language Oct. 1996, pp. 905-908.*

Boll, S. "Suppression of Acoustic Noise in Speech Using Spectral Subtraction", Acoustics, Speech and Signal Processing Apr. 1979, pp. 113-120.*

International Search Report dated Dec. 19, 2001.

Boll, Steven, "Suppression of Acoustic Noise in Speech Using Spectral Subtraction," IEEE Transactions on Acoustics, Speech, and Signal Processing, vol. ASSP-27, No. 2, pp. 113-120, Apr. 1979, no day.

* cited by examiner

NOISE SUPPRESSING APPARATUS AND NOISE SUPPRESSING METHOD

TECHNICAL FIELD

The present invention relates to a noise suppressing apparatus and noise suppressing method, and more particularly, to noise suppression in a communication system.

BACKGROUND ART

Speech communications by cellular telephone are often carried out in circumstances with large noises such as inside a car or on a street. When communications are carried out in such circumstances with large noises, it is important to suppress noise signals included in speech signals. One of noise suppressing techniques is a spectral subtraction method.

A noise suppressing apparatus using the spectral subtraction method will be described below. FIG. 1 is a block diagram illustrating an example of a configuration of a conventional noise suppressing apparatus. In FIG. 1, an input speech signal including a noise signal is subjected to the windowing processing in windowing section 11 using a trapezoid window. FFT section 12 performs Fast Fourier Transform on the processed signal, and outputs thus converted speech spectrum to spectral subtraction section 14 and noise spectrum estimating section 13.

Spectral subtraction section 14 subtracts the estimated noise spectrum generated in noise spectrum estimating section 13 from the input speech spectrum. IFFT section 15 performs Inverse Fast Fourier Transform on the input spectrum to transform into a speech signal. With respect to speech signals subjected to noise suppression processing per unit time basis, overlap adding section 16 adds intervals timewise overlapping one another to superimpose, thereby obtains a timewise continuous speech signal, and outputs a speech signal with a noise suppressed.

In this way, the conventional noise suppressing apparatus cancels a noise component by subtracting an estimated noise spectrum estimated from an interval with only a noise and no speech included therein, or the like from an input speech spectrum in frequency region obtained by performing FFT on an input speech signal, and performs IFFT on the spectrum subjected to the subtraction to transform into a speech signal in time region, and thereby outputs the speech signal with a noise suppressed.

However, in the conventional noise suppressing apparatus, since the subtraction is performed with respect to the amplitude of a speech spectrum and a phase of the spectrum is not considered, estimation of noise spectrum becomes difficult in a speech signal with a low signal-to-noise ratio or a speech signal with a generated non-stationary noise, a large error is thereby generated, and therefore it is difficult to suppress noises sufficiently.

DISCLOSURE OF INVENTION

It is an object of the present invention to provide a noise suppressing apparatus and noise suppressing method enabling both high effectiveness of noise suppression and reduction of suppression distortion even in a speech signal with a low signal-to-noise ratio or a speech signal with a generated non-stationary noise.

The object is achieved by calculating a signal-to-noise ratio from a speech interval and non-speech interval of a speech signal, and performing stronger noise suppression in a signal interval with a high signal-to-noise ratio, while restricting the suppression in an interval where a distortion is caused by the suppression in a signal interval with a low signal-to-noise ratio.

BEST MODE FOR CARRYING OUT THE INVENTION

Embodiments of the present invention will be described below with reference to accompanying drawings.

FIRST EMBODIMENT

With respect to a speech signal, a noise suppressing apparatus according to the first embodiment of the present invention performs stronger noise suppression in a signal interval with a high signal-to-noise ratio, while setting a subtraction lower limit in the noise suppression on an interval with a low signal-to-noise ratio to restrict the suppression.

Figure 1:
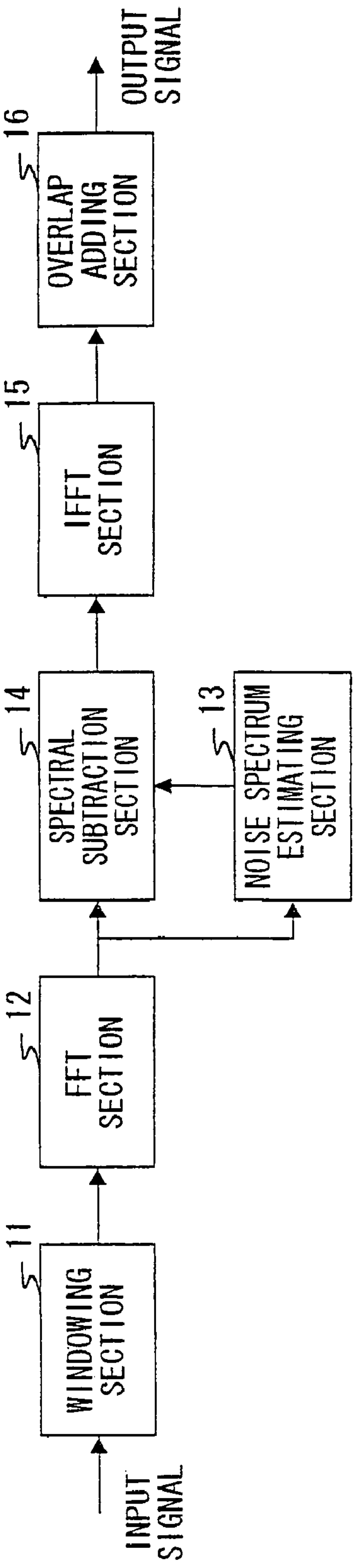
RELATED ART FIG. 1
FIG. 1 is a block diagram illustrating an example of a configuration of a conventional noise suppressing apparatus.
Figure 2:
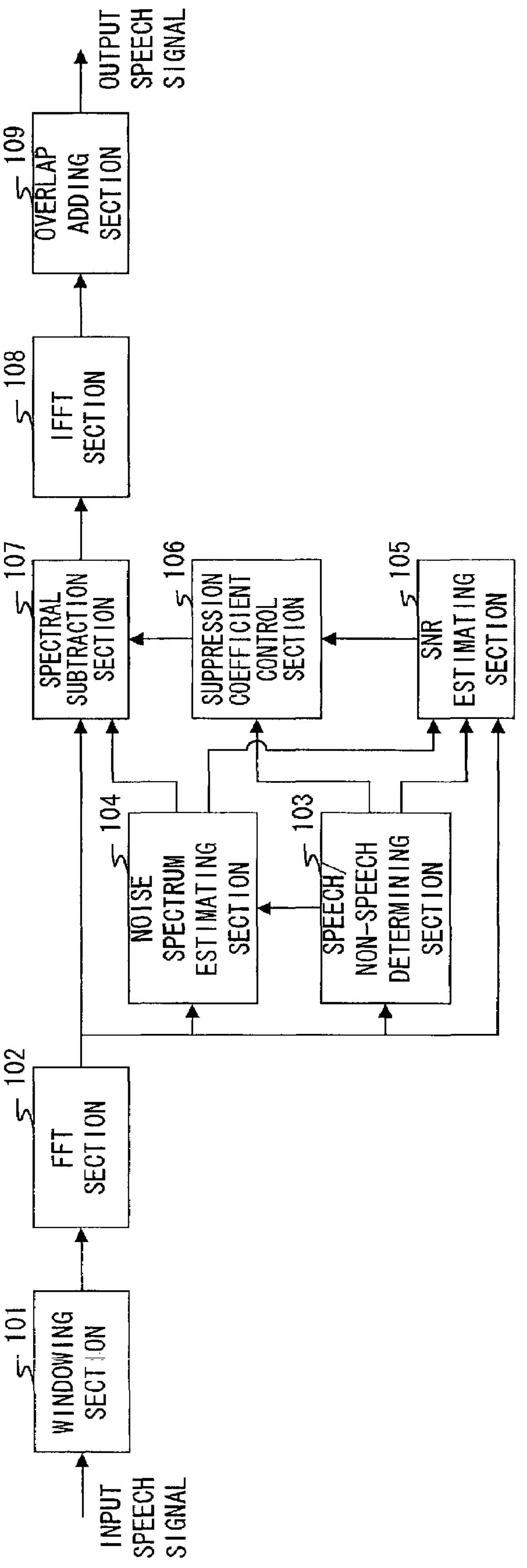
FIG. 2 is a block diagram illustrating a configuration of a noise suppressing apparatus according to a first embodiment of the present invention.

FIG. 2 is a block diagram illustrating a configuration of the noise suppressing apparatus according to the first embodiment of the present invention.

In FIG. 2 the noise suppressing apparatus is primarily composed of windowing section 101, FFT section 102, speech/non-speech determining section 103, noise spectrum estimating section 104, SNR estimating section 105, suppression coefficient control section 106, spectral subtraction section 107, IFFT section 108 and overlap adding section 109.

Windowing section 101 performs the windowing processing using a trapezoid window or the like on an input speech signal to output to FFT section 102. FFT section 102 performs (FFT) Fast Fourier Transform on the signal output from windowing section 101, and outputs a speech spectral signal to speech/non-speech determining section 103, noise spectrum estimating section 104, spectral subtraction section 107 and SNR estimating section 105.

Speech/non-speech determining section 103 makes a determination (hereafter referred to as "speech/non-speech determination") of whether the speech spectral signal output from FFT section 102 is of a speech interval with a speech included or of a non-speech interval with only a noise and no speech included. Then, speech/non-speech determining section 103 outputs a result of the speech/non-speech determination to noise spectrum estimating section 104, SNR estimating section 105 and suppression coefficient control section 106.

When the speech spectrum signal is of non-speech, noise spectrum estimating section 104 estimates a noise spectrum based on the speech spectral signal output from FFT section 102 to output to SNR estimating section 105 and spectral subtraction section 107.

Based on the speech/non-speech determination, SNR estimating section 105 obtains speech signal power from a smoothing-processed spectral power value of the speech spectrum of the speech interval, further obtains noise signal power from a smoothing-processed spectral power value of the speech spectrum of the non-speech interval; calculates a ratio of two values of the power to obtain SNR (Signal to Noise Ratio), and outputs SNR to suppression coefficient control section 106.

Based on the speech/non-speech determination and a value of SNR, suppression coefficient control section 106 outputs a suppression lower limit coefficient to spectrum subtraction section 107. Specifically, under a condition that a speech signal is of a speech interval and has SNR larger than a predetermined value, the section 106 sets a suppression lower limit coefficient at a predetermined value. Under conditions except the above condition, the section 106 sets a suppression lower limit coefficient at a value larger than the suppression lower limit coefficient applied when a speech signal is of a speech interval and has SNR larger than a predetermined value, and outputs the value to spectral subtraction section 107.

Spectral subtraction section 107 subtracts an estimated noise spectrum from the input speech spectrum, and outputs a speech spectrum with a noise suppressed. When the speech spectrum subjected to the subtraction is not more than a value obtained by multiplying an intensity of the input spectrum by the suppression lower limit coefficient, the section 107 outputs a value obtained by multiplying the speech spectrum, instead of the speech spectrum subjected to the subtraction, by the suppression lower limit coefficient to IFFT section 108 as a subtraction lower limit spectrum.

IFFT section 108 performs IFFT (Inverse Fast Fourier Transform) on the speech spectrum output from spectrum subtraction section 107, and outputs thus transformed speech signal to overlap adding section 109. With respect to the speech signal output from IFFT section 108, overlap adding section 109 superimposes intervals overlapping one another to output a superimposed output speech signal.

The operation of the noise suppressing apparatus with the above configuration will be described below with reference to a flow diagram shown in FIG. 3.

Figure 3:
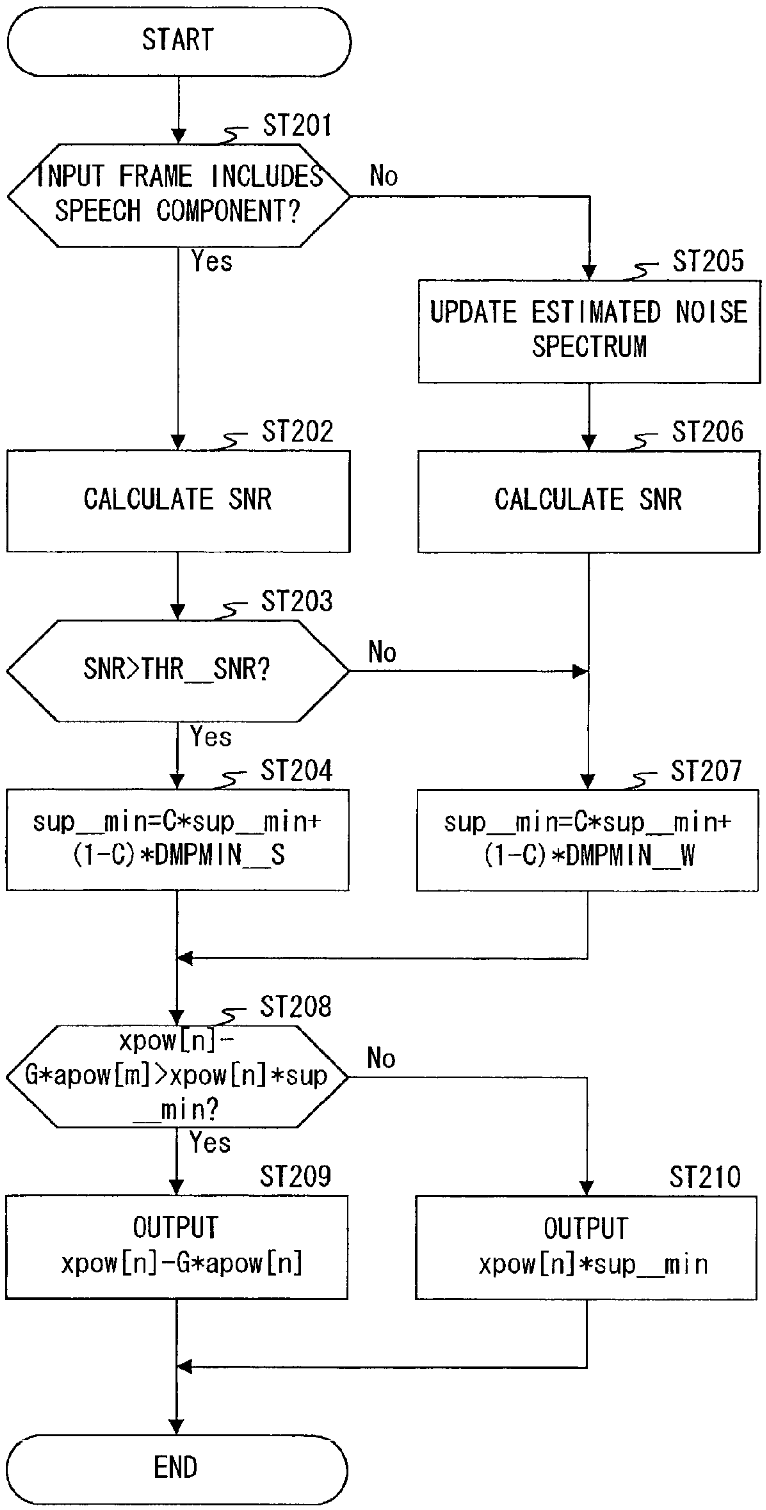
FIG. 3 is a flow diagram showing an operation of the noise suppressing apparatus in the above embodiment.

In FIG. 3 C denotes a smoothing coefficient, THR_SNR denotes a threshold, and sup_min denotes a suppression lower limit coefficient in a previous frame. DMPMIN_S denotes a band-separate suppression lower limit constant used in an interval in which an estimated SNR is high, DMPMIN_W denotes a band-separate suppression lower limit constant used in an interval in which an estimated SNR is low, and DMPMIN_S is less than DMPMIN_W (DMPMIN_S<DMPMIN_W). G denotes a coefficient in the subtraction, apow[m] denotes an estimated noise spectrum, xpow[n] denotes an input speech spectrum, and a band "m" of apow[m] corresponds to a band [n] of xpow[n].

In step (hereinafter referred to as "ST") 201, speech/non-speech determining section 103 determines whether or not an input frame includes a speech. The processing flow proceeds to ST202 when determining in ST201 that the input frame includes a speech, while proceeding to ST205 when determining in ST201 that the input frame does not include a speech.

In ST202 SNR estimating section 105 estimates SNR. In ST203 suppression coefficient control section 106 determines whether or not SNR is more than a predetermined threshold. The processing flow proceeds to ST204 when determining SNR is more than the threshold, while proceeding to ST207 when determining SNR is not more than the threshold.

In ST204 suppression coefficient control section 106 updates suppression lower limit coefficient sup_min so that the lower limit coefficient is asymptotic to band-separate suppression lower limit constant DMPMIN_S to perform strong suppression. In ST205 noise spectrum estimating section 104 estimates a noise spectrum from the input frame. In ST206 SNR estimating section 105 estimates SNR, and the processing flow proceeds to ST207.

In ST207 suppression coefficient control section 106 updates suppression lower limit coefficient sup_min so that the lower limit coefficient is asymptotic to band-separate suppression lower limit constant DMPMIN_W larger than the value in ST204 to perform weak suppression.

After updating the band-separate suppression lower limit coefficient in ST204 or 207, in ST208 spectral subtraction section 107 determines whether or not a result of noise suppression on the speech spectrum is more than the set lower limit of noise suppression.

In ST208 when determining a result of noise suppression on the speech spectrum is more than the set lower limit of noise suppression, in ST209 spectral subtraction section 107 outputs a result obtained by subtracting the noise spectrum from the speech spectrum. In ST208 when determining a result of noise suppression on the speech spectrum is not more than the lower limit of noise suppression, in ST210 spectral subtraction section 107 outputs a result obtained by multiplying the speech spectrum by the suppression lower limit coefficient.

Figure 4A:
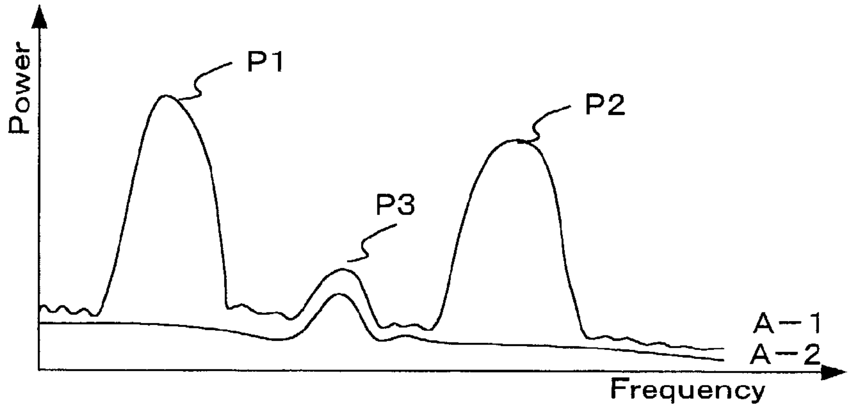
FIG. 4A is a graph showing an example of noise suppression processing on a speech spectrum when SNR is high in the above embodiment.
Figure 4B:
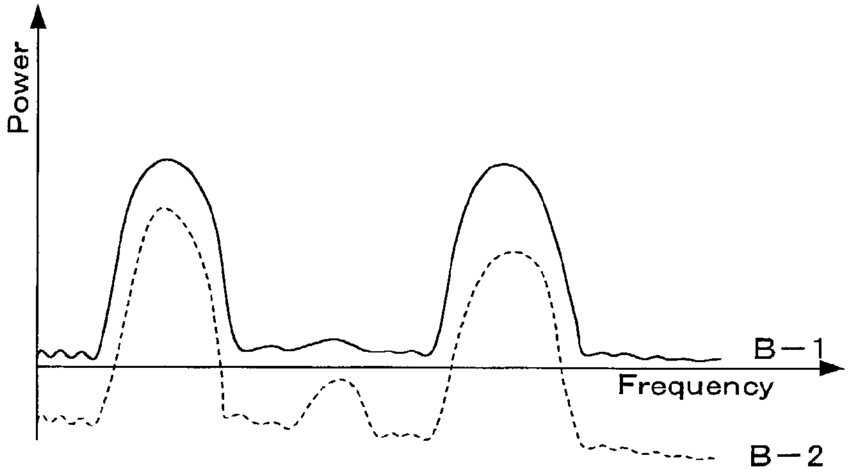
FIG. 4B is another graph showing an example of noise suppression processing on a speech spectrum when SNR is high in the above embodiment.
Figure 4C:
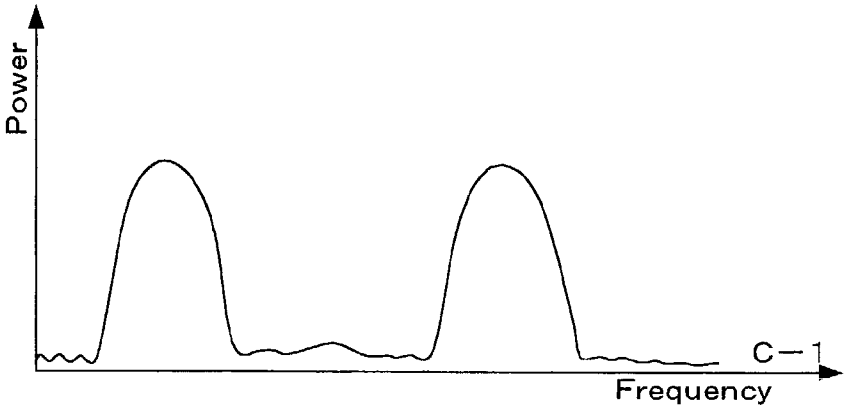
FIG. 4C is another graph showing an example of noise suppression processing on a speech spectrum when SNR is high in the above embodiment.

The suppression of speech spectrum will be described below. FIGS. 4A, 4B and 4C are graphs showing examples of noise suppression processing when SNR is high. In FIGS. 4A, 4B and 4C, the vertical axis indicates power of spectrum, and the horizontal axis indicates frequency. P1 and P2 indicate peaks of the speech signal, and P3 indicates a peak of the noise signal.

FIG. 4A is a graph showing an example of an input spectrum and estimated noise spectrum. When SNR is high, since accuracy in estimating the noise spectrum is high, shapes of noise peaks P3 of input spectrum A-1 and of noise spectrum A-2 are almost the same.

FIG. 4B shows a result obtained by subtracting noise spectrum A-2 from input spectrum A-1. In FIG. 4B subtraction spectrum B-1 is one obtained by subtracting noise spectrum A-2 from input spectrum A-1, where peak P3 of the noise spectrum is suppressed. Since subtraction spectrum B-1 indicates larger values than subtraction limit spectrum B-2 in the entire frequency band, spectrum C-1 as shown in FIG. 4C is output as an output speech spectrum.

Figure 5A:
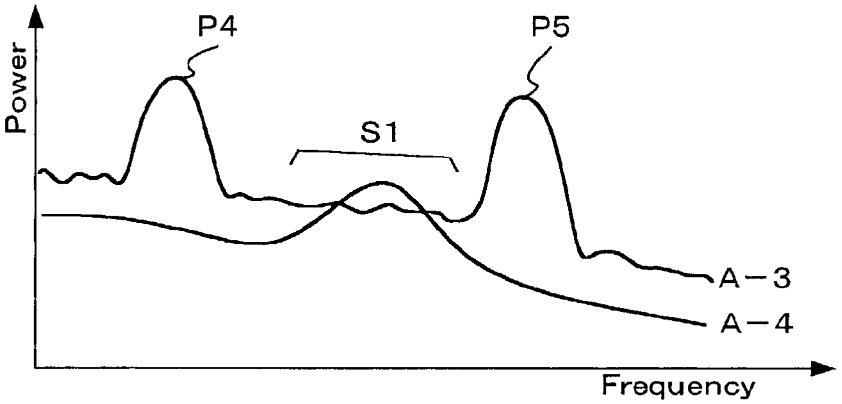
FIG. 5A is a graph showing an example of noise suppression processing on a speech spectrum when SNR is low in the above embodiment.
Figure 5B:
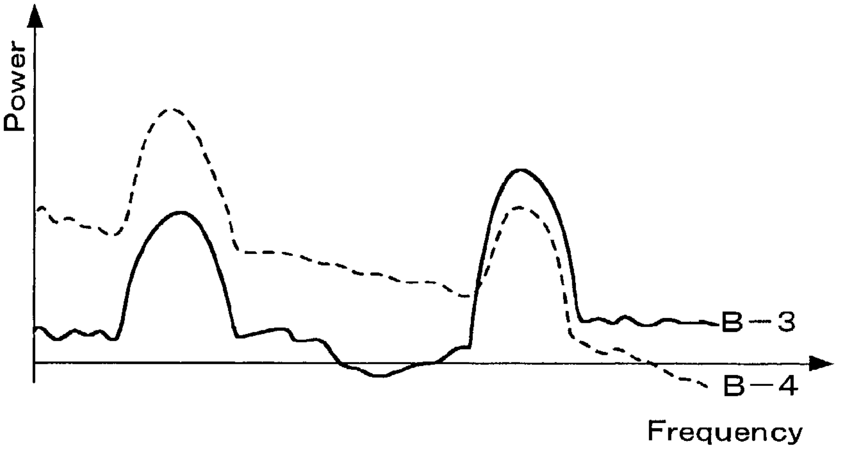
FIG. 5B is another graph showing an example of noise suppression processing on a speech spectrum when SNR is low in the above embodiment.
Figure 5C:
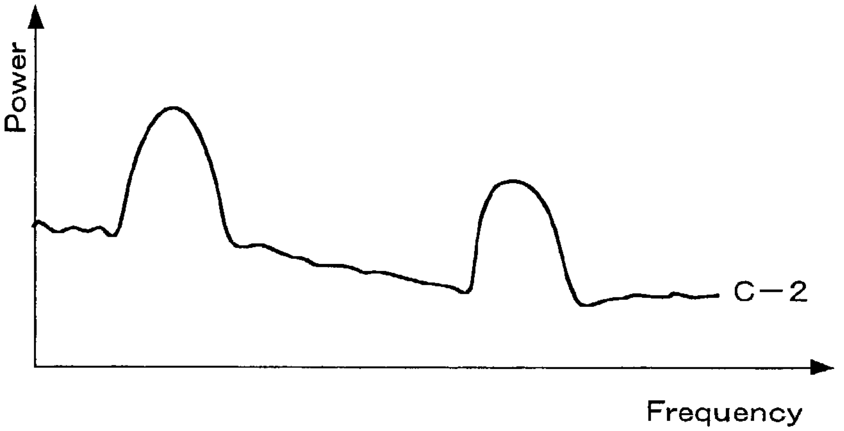
FIG. 5C is another graph showing an example of noise suppression processing on a speech spectrum when SNR is low in the above embodiment.

FIGS. 5A, 5B and 5C are graphs showing examples of noise suppression processing when SNR is low. In FIGS. 5A, 5B and 5C, the vertical axis indicates power of spectrum, and the horizontal axis indicates frequency. P4 and P5 indicate peaks of the speech signal.

FIG. 5A is a graph showing an example of an input spectrum and estimated noise spectrum.

In region S1, accuracy of estimate noise spectrum A-4 is low, and a noise larger than an actual noise is estimated.

FIG. 5B shows examples of a subtraction spectrum obtained by subtracting the estimated noise spectrum from the input spectrum and of a subtraction lower limit spectrum. In FIG. 5B subtraction spectrum B-3 is suppressed in regions around peak P4 and around S1 more than required.

Thus, when SNR is low, since the accuracy in estimating a noise spectrum is low, there exist a frequency region where a noise is not suppressed adequately and/or frequency region where a noise is suppressed more than required. As a result, a distortion occurs in a speech spectrum with a noise suppressed.

Therefore, by comparing subtraction spectrum B-3 with subtraction lower limit spectrum B-4 and outputting the spectrum of larger spectral intensity, the speech spectrum is prevented from being distorted due to noise suppression more than required.

FIG. 5C is a graph showing an example of a spectrum output after suppressing a noise. In FIG. 5C, in regions around peak P4 and around S1, since subtraction lower limit spectrum B-4 indicates larger values than subtraction spectrum B-3, subtraction lower limit spectrum B-4 becomes output spectrum C-2. Further, in the region around peak P5, since subtraction spectrum B-3 indicates larger values than subtraction lower limit spectrum B-4, subtraction spectrum B-3 becomes output spectrum C-2.

In this way, according to the noise suppressing apparatus of this embodiment, with respect to a speech signal, since a noise spectrum is capable of being estimated with more accuracy in a speech interval with a high signal-to-noise ratio, stronger suppression is performed in an interval with a higher signal-to-noise ratio. It is thereby possible to perform effective noise suppression with less speech distortions.

Further, according to the noise suppressing apparatus of this embodiment, in an interval with a low signal-to-noise ratio, a subtraction lower limit set, and it is thereby possible to prevent noise suppression from being performed more than required, and to reduce speech distortions.

SECOND EMBODIMENT

A noise suppressing apparatus of the second embodiment of the present invention performs stronger suppression in an interval with a higher signal-to-noise ratio, while performing weaker suppression in an interval with a lower signal-to-noise ratio, in an interval determined as a non-speech of an input speech signal.

Figure 6:
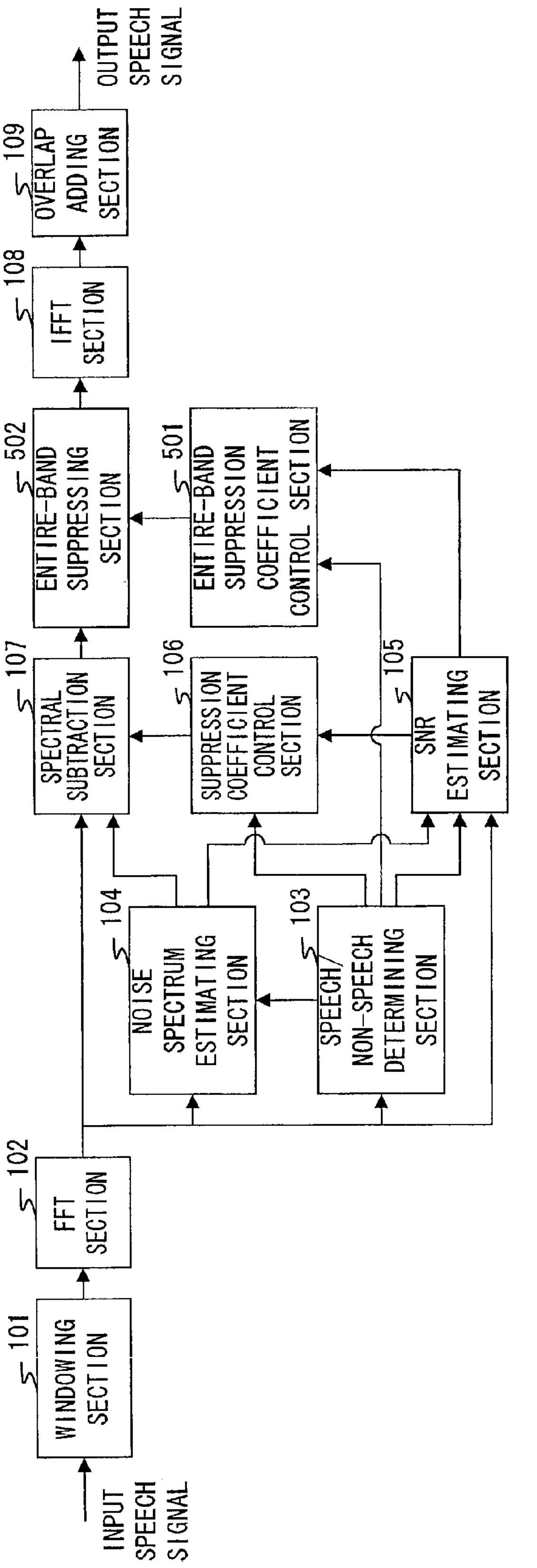
FIG. 6 is a block diagram illustrating a configuration of a noise suppressing apparatus according to a second embodiment of the present invention.

FIG. 6 is a block diagram illustrating an example of a configuration of a noise suppressing apparatus according to the second embodiment. In addition, sections common to FIG. 2 are assigned the same reference numerals as in FIG. 2 to omit specific descriptions thereof. The noise suppressing apparatus in FIG. 6 is provided with entire-band suppression coefficient control section 501 and entire-bane suppressing section 502, suppresses a speech spectrum in the entire band, and in this respect, differs from the apparatus in FIG. 2.

In FIG. 6 speech/non-speech determining section 103 determines whether a speech spectral signal output from FFT section 102 is of a speech interval with a speech included or of a non-speech interval with only a noise and no speech included, and outputs a determination to noise spectrum estimating section 104, SNR estimating section 105, suppression coefficient control section 106 and entire-band suppression coefficient control section 501.

Based on the speech/non-speech determination of the speech signal output from speech/non-speech determining section 103, SNR estimating section 105 obtains speech signal power from a smoothing-processed spectral power value of the speech spectrum of the speech interval, further obtains noise signal power from a smoothing-processed spectral power value of the speech spectrum of the non-speech interval, calculates a ratio of two values of the power to obtain SNR, and outputs SNR to suppression coefficient control section 106 and entire-band suppression coefficient control section 501.

Entire-band suppression coefficient control section 501 outputs to entire-band suppressing section 502 a value of the entire-band suppression coefficient such that the suppression is not performed when the speech signal is of a speech interval. When the speech signal is of a non-speech interval, the section 501 outputs to entire-band suppressing section 502 values such that stronger suppression is performed as SNR is higher and that weaker suppression is performed as SNR is lower.

Entire-band suppressing section 502 multiplies the speech spectrum sup[n] output from spectral subtraction section 107 by an entire-band suppression coefficient, thereby suppresses the speech spectrum in the entire frequency band, and outputs the resultant spectrum to IFFT section 108.

The operation of the noise suppressing apparatus with the above configuration will be described below with reference to a flow diagram illustrated in FIG. 7.

Figure 7:
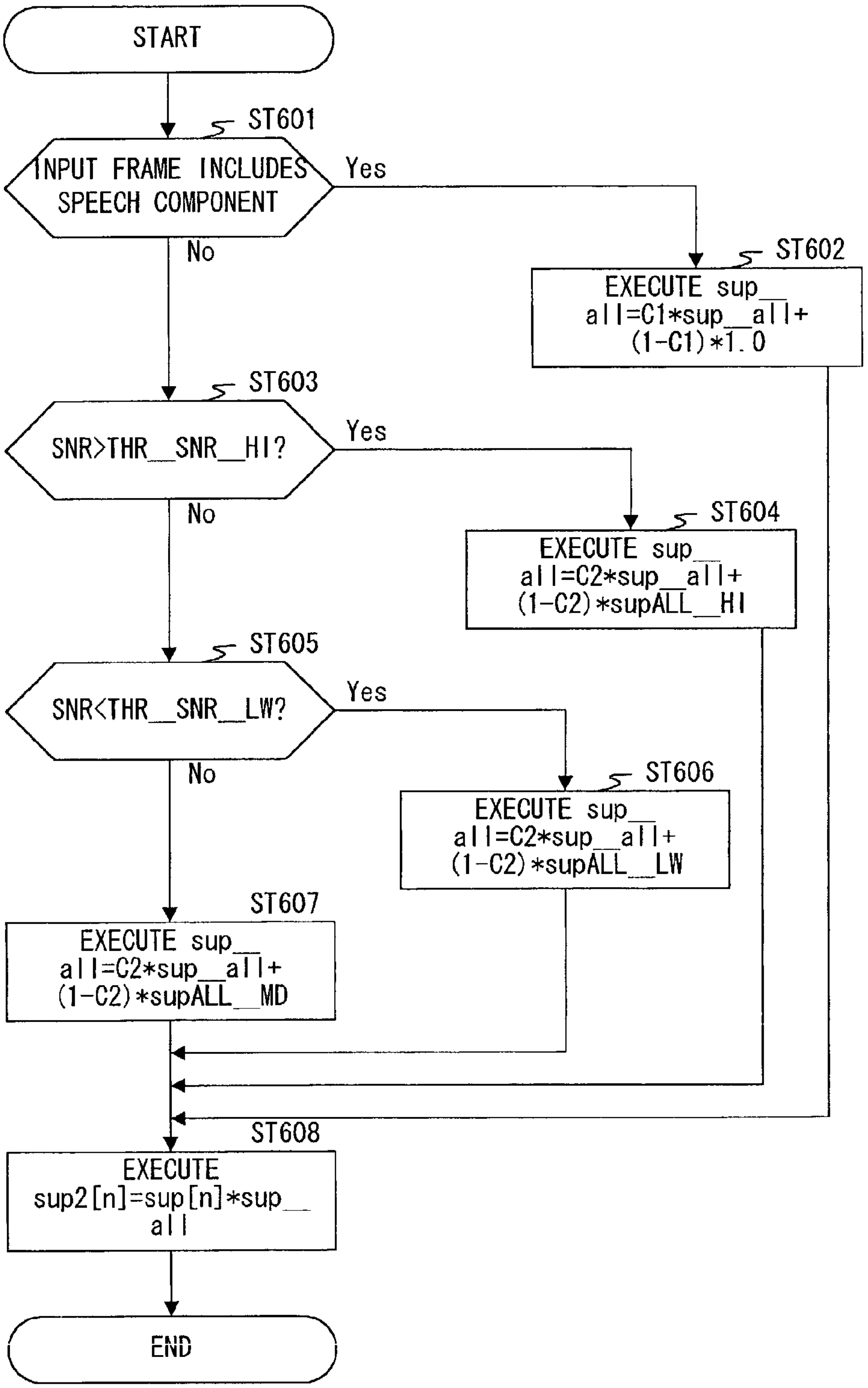
FIG. 7 is a flow diagram showing an operation of the noise suppressing apparatus in the above embodiment.

In FIG. 7 sup[n] denotes a noise suppressed spectrum before undergoing the entire-band suppression, sup2[n] denotes a noise suppressed spectrum after undergoing the entire-band suppression, sup_all denotes an entire-band suppression coefficient, SUPALL_HI denotes an entire-band suppression coefficient used in an interval with an estimated SNR of high value, SUPALL_MD denotes an entire-band suppression coefficient used in an interval with an estimated SNR of middle value, and SUPALL_LW denotes an entire-band suppression coefficient used in an interval with an estimated SNR of low value with the following equation satisfied:

$$0.0 \leqq SUPALL\_HI \leqq SUPALL\_MD \leqq SUPALL\_LW \leqq 1.0$$

Each of THR_SNR_HI and THR_SNR_LW denotes a threshold, where THR_SNR_HI is more than THR_SNR_LW (THR_SNR_HI>THR_SNR_LW). Each of C1 and C2 denotes a smoothing coefficient.

In ST601 speech/non-speech determining section 103 determines whether or not an input frame includes a speech. When determining that the input frame includes a speech in ST601, in ST602 entire-band suppression coefficient control section 501 updates an entire-band coefficient, and the processing flow proceeds to ST608.

When determining that the input frame does not include a speech in ST601, in ST603 entire-band suppression coefficient control section 501 determines whether or not SNR is more than a predetermined threshold. When determining that SNR is more than the predetermined threshold in ST603, in ST604 entire-band suppression coefficient control section 501 updates the entire-band coefficient, and the processing flow proceeds to ST608.

When determining that SNR is not more than the predetermined threshold in ST603, in ST605 entire-band suppression coefficient control section 501 determines whether or not SNR is less than a predetermined threshold. When determining that SNR is less than the predetermined threshold in ST605, in ST606 entire-band suppression coefficient control section 501 updates the entire-band coefficient, and the processing flow proceeds to ST608.

When determining that SNR is not less than the predetermined threshold in ST605, in ST607 entire-band suppression coefficient control section 501 updates the entire-band suppression coefficient. In ST608 entire-band suppressing section 502 outputs a result of multiplication of the speech spectrum by the entire-band suppression coefficient.

Thus, according to the noise suppressing apparatus of this embodiment, with respect to a speech signal, since a noise spectrum is capable of being estimated with high accuracy in a speech interval with a high signal-to-noise ratio, stronger suppression is performed in an interval with a higher signal-to-noise ratio. It is thereby possible to perform effective noise suppression with less speech distortions.

Further, according to the noise suppressing apparatus of this embodiment, a frame determined as a non-speech undergoes the entire-band suppression that does not cause any distortions due to the suppression, and it is thereby possible to perform noise suppression that provides a signal having no speech component with less distortions.

Furthermore, according to the noise suppressing apparatus of this embodiment, in a frame with no speech component included of a speech signal, stronger suppression is performed in a region with a high signal-to-noise ratio, while performing weaker suppression in a region with a low signal-to-noise ratio. It is thereby possible to perform effective noise suppression with less distortions in a frame with only a noise component included.

THIRD EMBODIMENT

Figure 8:
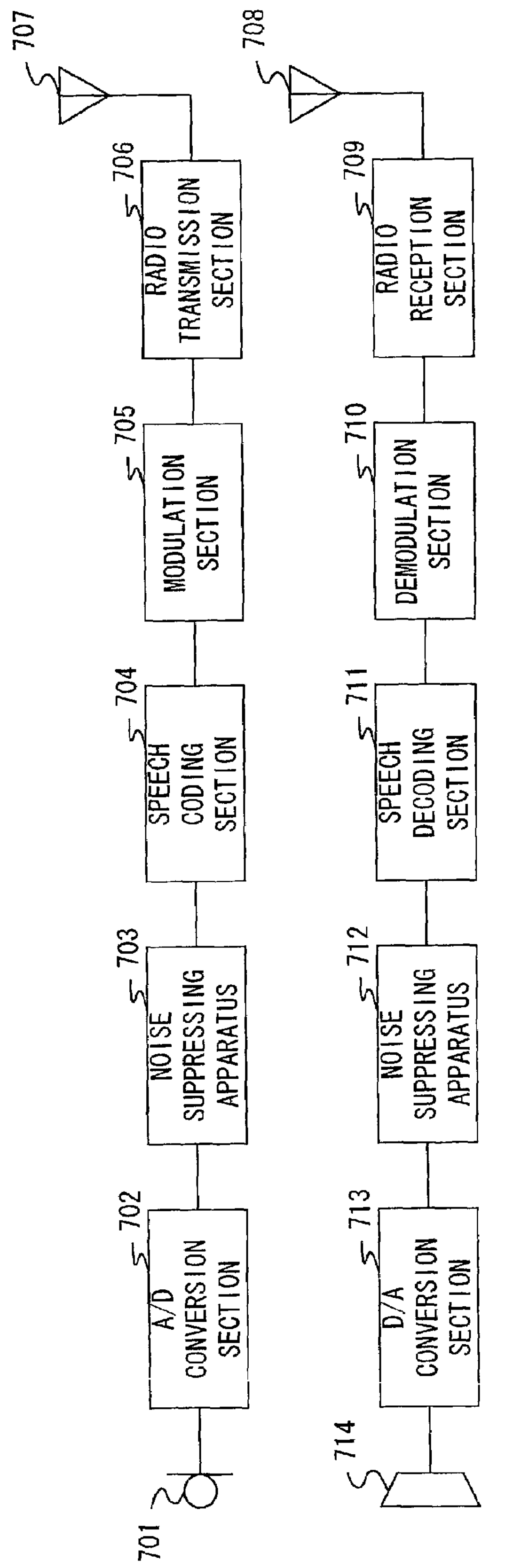
FIG. 8 is a block diagram illustrating an example of a configuration of a radio communication apparatus provided with the noise suppressing apparatus according to the first embodiment or second embodiment.

FIG. 8 is a block diagram illustrating an example of a configuration of a radio communication apparatus provided with the noise suppressing apparatus according to the first embodiment or second embodiment of the present invention.

The radio communication apparatus in FIG. 8 is comprised of speech input section 701, A/D conversion section 702, noise suppressing apparatus 703, speech coding section 704, modulation section 705, radio transmission section 706, antenna 707, antenna 708, radio reception section 709, demodulation section 710, speech decoding section 711, noise suppressing apparatus 712, D/A conversion section 713, and speech output section 714.

Speech input section 701 converts a speech input from a microphone or the like to an electric signal, and outputs the obtained speech signal to A/D conversion section 702. A/D conversion section 702 performs analog-to-digital conversion on the speech signal output from speech input section 701 to output to noise suppressing apparatus 703.

Noise suppressing apparatus 703 is the noise suppressing apparatus according to one of the above embodiments 1 to 3. With respect to the speech signal output from A/D conversion section 702, the apparatus 703 performs stronger noise suppression in a signal interval with a high signal-to-noise ratio, while restricting the suppression in an interval where a distortion is caused by the suppression in a signal interval with a low signal-to-noise ratio, and outputs a speech signal with a noise suppressed to speech coding section 704.

Speech coding section 704 performs speech coding on the speech signal output from noise suppressing apparatus 703 to output to modulation section 705. Modulation section 705 modulates the speech signal output from speech coding section 704 to output to radio transmission section 706. Radio transmission section 706 converts the speech signal output from modulation section 705 into a signal of radio frequency, and outputs the signal as a transmission signal to antenna 707. Antenna 707 transmits the transmission signal as a radio signal.

Antenna 708 receives a radio signal, and outputs the signal as a received signal to radio reception section 709. Radio reception section 709 converts the received signal received in antenna 708 into a baseband signal to output to demodulation section 710. Demodulation section 710 demodulates the received signal output from radio reception section to output to speech decoding section 711. Speech decoding section 711 performs speech decoding on the received signal output from demodulation section 710 to output to noise suppressing apparatus 712.

With respect to the speech signal output from speech decoding section 711, noise suppressing apparatus 712 performs stronger noise suppression in a signal interval with a high signal-to-noise ratio, while restricting the suppression in an interval where a distortion is caused by the suppression in a signal interval with a low signal-to-noise ratio, and outputs a speech signal with a noise suppressed to D/A conversion section 713.

D/A conversion section 713 performs digital-to-analog conversion on the received signal output from noise suppressing apparatus 703, and outputs an analog speech signal to speech output section 714. Speech output section 714 outputs the speech signal output from D/A conversion section 713 as a speech with a speaker or the like.

Thus, according to the radio communication apparatus of this embodiment, with respect to a speech signal, since a noise spectrum is capable of being estimated with more accuracy in a speech interval with a high signal-to-noise ratio, stronger suppression is performed in an interval with a higher signal-to-noise ratio. It is thereby possible to transmit and receive speeches subjected to effective noise suppression with less speech distortions.

In addition, while the speech enhancement according to the above embodiments is explained using a speech enhancement apparatus, the speech enhancement is capable of being achieved by software. For example, a program for performing the above-mentioned speech enhancement may be stored in advance in ROM (Read Only Memory), and the program may be operated with CPU (Central Processor Unit).

Further, it may be possible that the above-mentioned program for performing the speech enhancement is stored in a computer readable storage medium, the program stored in the storage medium is stored in RAM (Random Access Memory) in a computer, and the computer executes the processing according to the program. Also in such a case, the same operations and effectiveness as in the above-mentioned embodiments are obtained.

Still furthermore, it may be possible that the above-mentioned program for performing the speech enhancement is stored in a server to be transferred to a client, and the client executes the program. Also in such a case, the same operations and effectiveness as in the above-mentioned embodiments are obtained.

As is apparent from the foregoing, according to the present invention, it is possible to perform noise suppression with less distortions even in a speech signal with a low signal-to-noise ratio or a speech signal with a generated non-stationary noise.

This application is based on the Japanese Patent Application No.2000-264196 filed on Aug. 31, 2000, entire content of which is expressly incorporated by reference herein.

Industrial Applicability

The present invention is suitable for the use in noise suppression in a communication system.

The invention claimed is:

1. A noise suppression apparatus comprising:

a conversion section that converts an input speech signal to a speech spectrum in frame units;

a speech/non-speech determining section that determines, on a per frame basis, whether or not the speech spectrum includes a speech component;

a noise estimating section that estimates a noise spectrum based on the speech spectrum;

an SNR calculating section that calculates a signal-to-noise ratio based on the speech spectrum and the noise spectrum;

a suppression coefficient control section that: (i) updates a suppression lower limit coefficient using a first predetermined coefficient, when the speech spectrum includes a speech component and the signal-to-noise ratio is greater than a predetermined value, and (ii) for other cases, updates the suppression lower limit coefficient using a second predetermined coefficient, said second coefficient being greater than the first coefficient; and a suppressed speech spectrum calculating section that: (i) compares: (a) a subtraction spectrum, in which the noise spectrum is subtracted from the speech spectrum, and (b) a subtraction lower limit spectrum, in which the speech spectrum is multiplied by the suppression lower limit coefficient, and (ii) outputs a suppression speech spectrum formed with greater parts selected from the subtraction spectrum and the subtraction lower limit spectrum.

2. The noise suppression apparatus according to claim 1, wherein:

the speech/non-speech determining section identifies a frame of the input speech signal that does not include any speech component; and the noise estimating section estimates the noise spectrum from the identified frame.

3. The noise suppression apparatus according to claim 2, further comprising an entire band suppressing section that multiplies the suppression speech spectrum by a predetermined entire-band suppression coefficient.

4. The noise suppression apparatus according to claim 3, wherein the entire-band suppressing section (i) multiplies the suppression speech spectrum by the entire-band suppression coefficient updated by a value of 1, when the speech spectrum includes a speech component and (ii) multiplies the suppression speech spectrum by the entire-band suppression coefficient updated by a value less than 1, when the speech spectrum does not include a speech component.

5. The noise suppression apparatus according to claim 4, wherein when the speech spectrum does not include a speech component, the entire-band suppressing section uses an entire-band suppression coefficient for performing stronger suppression on a signal as the signal-to-noise ratio of the signal is increased.

6. The noise suppression apparatus according to claim 1, further comprising an entire band suppressing section that multiplies the suppression speech spectrum by a predetermined entire-band suppression coefficient.

7. The noise suppression apparatus according to claim 6, wherein the entire-band suppressing section (i) multiplies the suppression speech spectrum by the entire-band suppression coefficient updated by a value of 1, when the speech spectrum includes a speech component and (ii) multiplies the suppression speech spectrum by the entire-band suppression coefficient updated by a value less than 1, when the speech spectrum does not include a speech component.

8. The noise suppression apparatus according to claim 7, wherein when the speech spectrum does not include a speech component, the entire-band suppressing section uses an entire-band suppression coefficient for performing stronger suppression on a signal as the signal-to-noise ratio of the signal is increased.

9. A radio communication apparatus having a noise suppression apparatus, the noise suppression apparatus comprising:

a conversion section that converts an input speech signal to a speech spectrum in frame units;

a speech/non-speech determining section that determines, on a per frame basis, whether or not the speech spectrum includes a speech component;

a noise estimating section that estimates a noise spectrum based on the speech spectrum;

an SNR calculating section that calculates a signal-to-noise ratio based on the speech spectrum and the noise spectrum;

a suppression coefficient control section that: (i) updates a suppression lower limit coefficient using a first predetermined coefficient, when the speech spectrum includes a speech component and the signal-to-noise ratio is greater than a predetermined value, and (ii) for other cases, updates the suppression lower limit coefficient using a second predetermined coefficient, said second coefficient being greater than the first coefficient; and a suppressed speech spectrum calculating section that: (i) compares: (a) a subtraction spectrum, in which the noise spectrum is subtracted from the speech spectrum, and (b) a subtraction lower limit spectrum, in which the speech spectrum is multiplied by the suppression lower limit coefficient, and (ii) outputs a suppression speech spectrum formed with greater parts selected from the subtraction spectrum and the subtraction lower limit spectrum.

10. A noise suppressing program stored on a computer readable medium, the program comprising computer executable instructions for:

converting an input speech signal to a speech spectrum in frame units;

determining, on a per frame basis, whether or not the speech spectrum includes a speech component;

estimating a noise spectrum based on the speech spectrum;

calculating a signal-to-noise ratio based on the speech spectrum and the noise spectrum;

updating a suppression lower limit coefficient using a first predetermined coefficient, when the speech spectrum includes a speech component and the signal-to-noise ratio is greater than a predetermined value;

updating the suppression lower limit coefficient using a second predetermined coefficient, said second coefficient being greater than the first coefficient, when the speech spectrum does not include a speech component or the signal-to-noise ratio is not greater than a predetermined value;

comparing: (a) a subtraction spectrum, in which the noise spectrum is subtracted from the speech spectrum, and (b) a subtraction lower limit spectrum, in which the speech spectrum is multiplied by the suppression lower limit coefficient; and outputting a suppression speech spectrum formed with greater parts selected from the subtraction spectrum and the subtraction lower limit spectrum.

11. A noise suppressing method comprising:

converting an input speech signal to a speech spectrum in frame units;

determining, on a per frame basis, whether or not the speech spectrum includes a speech component;

estimating a noise spectrum based on the speech spectrum;

calculating a signal-to-noise ratio based on the speech spectrum and the noise spectrum;

updating a suppression lower limit coefficient using a first predetermined coefficient, when the speech spectrum includes a speech component and the signal-to-noise ratio is greater than a predetermined value;

updating the suppression lower limit coefficient using a second predetermined coefficient, said second coefficient being greater than the first coefficient, when the speech spectrum does not include a speech component or the signal-to-noise ratio is not greater than a predetermined value;

comparing: (a) a subtraction spectrum, in which the noise spectrum is subtracted from the speech spectrum, and (b) a subtraction lower limit spectrum, in which the speech spectrum is multiplied by the suppression lower limit coefficient; and outputting a suppression speech spectrum formed with greater parts selected from the subtraction spectrum and the subtraction lower limit spectrum.

* * * * *